(12) United States Patent
Zhao et al.

(10) Patent No.: US 10,356,308 B2
(45) Date of Patent: Jul. 16, 2019

(54) FOCUSING STATE PROMPTING METHOD AND SHOOTING DEVICE

(71) Applicant: NUBIA TECHNOLOGY CO., LTD., Shenzhen (CN)

(72) Inventors: Yunze Zhao, Shenzhen (CN); Lei Miao, Shenzhen (CN); Xiaohui Cui, Shenzhen (CN)

(73) Assignee: Nubia Technology Co., Ltd., Shenzhen (CN)

( * ) Notice: Subject to any disclaimer, the term of this patent is extended or adjusted under 35 U.S.C. 154(b) by 314 days.

(21) Appl. No.: 15/322,287

(22) PCT Filed: May 29, 2015

(86) PCT No.: PCT/CN2015/080358
§ 371 (c)(1),
(2) Date: Dec. 27, 2016

(87) PCT Pub. No.: WO2015/196896
PCT Pub. Date: Dec. 30, 2015

(65) Prior Publication Data
US 2019/0014255 A1    Jan. 10, 2019

(30) Foreign Application Priority Data

Jun. 27, 2014   (CN) .......................... 2014 1 0299594

(51) Int. Cl.
*G06T 7/13*       (2017.01)
*H04N 5/232*      (2006.01)

(52) U.S. Cl.
CPC .......... *H04N 5/23212* (2013.01); *G06T 7/13* (2017.01); *H04N 5/23222* (2013.01); *H04N 5/23293* (2013.01); *H04N 5/232939* (2018.08)

(58) Field of Classification Search
CPC ......... H04N 5/23212; H04N 5/232939; H04N 5/23222; G06T 7/13; G02B 7/36;
(Continued)

(56) References Cited

U.S. PATENT DOCUMENTS

| 2004/0066563 | A1* | 4/2004 | Voss .......................... G02B 7/28 359/698 |
| 2006/0204121 | A1* | 9/2006 | Bryll ..................... G06K 9/6288 382/255 |

(Continued)

FOREIGN PATENT DOCUMENTS

| CN | 101702053 | 5/2010 |
| CN | 102025910 | 4/2011 |

(Continued)

OTHER PUBLICATIONS

Extend European Search Report for EP 15811809.1, completed by the European Patent Office dated Jun. 9, 2017 All together 7 Pages.
(Continued)

*Primary Examiner* — Chia Wei A Chen
(74) *Attorney, Agent, or Firm* — Brooks Kushman P.C.

(57) ABSTRACT

A focusing state prompting method and a shooting device are described. The method includes detecting whether there is a clear picture region in a preview interface using an edge detection algorithm; and if so, prompting that focusing is completed.

12 Claims, 3 Drawing Sheets

(58) Field of Classification Search
CPC . G02B 7/365; G02B 7/38; G03B 7/28; G03B 13/24
See application file for complete search history.

(56) References Cited

U.S. PATENT DOCUMENTS

| | | | |
|---|---|---|---|
| 2008/0036900 A1 | 2/2008 | Nakajima et al. | |
| 2008/0181495 A1* | 7/2008 | Spampinato | H04N 19/186 382/167 |
| 2008/0253675 A1* | 10/2008 | Chou | H04N 5/217 382/255 |
| 2010/0002941 A1* | 1/2010 | Fonseca | G06F 17/30265 382/209 |
| 2011/0058031 A1* | 3/2011 | Kurihara | G06K 9/2018 348/135 |
| 2011/0102643 A1* | 5/2011 | Nanu | G06K 9/00248 348/241 |
| 2011/0273610 A1* | 11/2011 | Tay | H04N 5/23212 348/345 |
| 2012/0008872 A1* | 1/2012 | Tay | G02B 7/36 382/255 |
| 2012/0013759 A1 | 1/2012 | Chen | |
| 2012/0051606 A1* | 3/2012 | Saikia | G06T 7/13 382/128 |
| 2012/0314116 A1* | 12/2012 | Jannard | G03B 13/18 348/333.02 |
| 2013/0286217 A1 | 10/2013 | Tsuji | |
| 2014/0002716 A1 | 1/2014 | Yamada et al. | |
| 2014/0233826 A1* | 8/2014 | Agaian | G16H 50/30 382/133 |
| 2014/0267675 A1* | 9/2014 | Matsunobu | H04N 7/183 348/80 |
| 2014/0333790 A1* | 11/2014 | Wakazono | H04N 5/23241 348/222.1 |
| 2014/0347557 A1* | 11/2014 | Gomita | H04N 7/0125 348/441 |
| 2015/0116353 A1* | 4/2015 | Miura | G06T 11/60 345/632 |
| 2016/0094782 A1* | 3/2016 | Tay | H04N 5/23212 382/255 |
| 2017/0201674 A1* | 7/2017 | Yamamoto | H04N 5/23212 |
| 2018/0376065 A1* | 12/2018 | Wakazono | H04N 5/23212 |

FOREIGN PATENT DOCUMENTS

| | | |
|---|---|---|
| CN | 102033388 | 4/2011 |
| CN | 102243705 | 11/2011 |
| CN | 102333176 | 1/2012 |
| CN | 102981347 | 3/2013 |
| CN | 103379279 | 10/2013 |
| CN | 104038699 | 9/2014 |

OTHER PUBLICATIONS

International Search Report for PCT/CN2015/080358, English Translation attached to original, Both completed by the Chinese Patent Office dated Jul. 15, 2015, All together 5 Pages.

* cited by examiner

FOCUSING STATE PROMPTING METHOD AND SHOOTING DEVICE

CROSS-REFERENCE TO RELATED APPLICATION

This application is the U.S. national phase of PCT Application No. PCT/CN2015/080358 filed May 29, 2015 which claims priority to Chinese Application No. 201410299594.0 filed Jun. 27, 2014, the disclosures of which are incorporated in their entirety by reference herein.

TECHNICAL FIELD

The present document relates to the field of photography technology, in particular to a method for prompting a focusing state and a shooting device.

BACKGROUND

In the existing technology, when a shooting device is in shooting, during framing and preview, a touch focusing is performed or continuous auto-focusing is turned on, the shooting is performed after focusing is completed, a photo with better effect can be taken. However, a user cannot be prompted by the shooting device of the existing technology after the focusing is completed, the user can determine a current focusing state only by themselves. For the average user, in many cases, it is difficult to accurately determine whether the current focusing is completed, if the shooting is performed before the focusing is completed, it will result in a poor shooting effect; if the user waits for a long time to ensure that the focusing is completed, it will slow down the shooting speed, especially under the case of capturing. As a result, the user's experience is poor.

SUMMARY

An embodiment of the present document provides a method for prompting a focusing state and a shooting device, which can rapidly and accurately prompt the focusing state and improve the shooting speed and the shooting effect.

An embodiment of the present document provides a method for prompting a focusing state, the method includes the steps of:

using an edge detection algorithm to detect whether there is a clear picture region in a preview;

if yes, prompting that focusing is completed.

Alternatively, said using an edge detection algorithm to detect whether there is a clear picture region in a preview includes:

using the edge detection algorithm to calculate a gray-level change value of a region where each pixel in the preview is located;

if a gray-level change value of a pixel is greater than a preset threshold value, taking the pixel as an edge pixel; and determining a region defined by a plurality of edge pixels as the clear picture region.

Alternatively, said using the edge detection algorithm to calculate a gray-level change value of a region where each pixel is located in the preview includes:

calculating gray-level values of a plurality of pixels around any one pixel in the preview, herein, a region consisting of the any one pixel and the plurality of pixels around the any one pixel is a region where the any one pixel is located;

using the edge detection algorithm to calculate a gray-level change value of the region where the any one pixel is located according to the gray-level values; and thereby traversing all pixels in the preview to calculate the gray-level change value of the region where each pixel in the preview is located.

Alternatively, said prompting that focusing is completed includes: marking an edge of the clear picture region by using a distinctive color to prompt that the focusing is completed.

Alternatively, said marking an edge of the clear picture region by using a distinctive color includes: darkening or fading a color of the edge of the clear picture region to be distinguished from a surrounding region, or replacing a color distinguished from a surrounding region for the edge of the clear picture region.

An embodiment of the present document still provides a shooting device, including an edge detection module and a prompting module, herein:

the edge detection module is configured to use an edge detection algorithm to detect whether there is a clear picture region in a preview, if yes, send a signal to the prompting module;

the prompting module is configured to prompt the user that the focusing is completed according to the signal sent by the edge detection module.

Alternatively, the edge detection module is configured to use the edge detection algorithm to calculate a gray-level change value of a region where each pixel in the preview is located;

if a gray-level change value of a pixel is greater than a preset threshold value, take the pixel as an edge pixel; and determine a region defined by a plurality of edge pixels as the clear picture region.

Alternatively, the edge detection module using an edge detection algorithm to calculate a gray-level change value of a region where each pixel in the preview is located, includes:

the edge detection module calculating gray-level values of a plurality of pixels around any one pixel in the preview, herein, a region consisting of the any one pixel and the plurality of pixels around the any one pixel is a region where the any one e pixel is located;

the edge detection module using the edge detection algorithm to calculate the gray-level change value of the region where the any one pixel is located according to the gray-level values; and thereby the edge detection module traversing all pixels in the preview to calculate the gray-level change value of the region where each pixel in the preview is located.

Alternatively, the prompting module is configured to mark an edge of the clear picture region by using a distinctive color to prompt that the focusing is completed.

Alternatively, the prompting module marking an edge of the clear picture region by using a distinctive color includes: the prompting module darkening or fading a color of the edge of the clear picture region to be distinguished from a surrounding region, or replacing a color distinguished from a surrounding region for the edge of the clear picture region.

An embodiment of the present document still provides a computer readable storage medium, storing program instructions, herein when the program instructions are executed, the above method is realized.

An embodiment of the present document provides a method for prompting a focusing state. During a focusing process, an edge detection is performed on a preview by using an edge detection algorithm, whether there is a clear picture region in the preview is determined according to a detection result, if yes, the focusing is determined to be completed, a user is prompted through a sound reminder, a lighting reminder, color outline, and other manners. Therefore, the user can take a shot immediately after the focusing is complete, this not only improves a shooting speed but also ensures the shooting effect, thereby enhancing the user's experience. Meanwhile, the accuracy of performing the edge detection on the preview to determine the focusing state is higher.

DETAILED EMBODIMENTS

For a method for prompting a focusing state of an embodiment of the present document, during a shooting process, the edge detection is performed on a preview using an edge detection algorithm, whether there is a clear picture region in the preview is determined according to a detection result, if yes, focusing is determined to be completed and a user is prompted immediately. And the user shoots immediately after receiving a prompt, this not only realizes rapid shooting but also takes a photo with a better effect. The edge detection algorithm can be Sobel operator, Prewitt operator, or Roberts Cross operator, etc. A flow chart is shown in the following embodiment.

It should be noted that the embodiments of the present document and the features of the examples can be arbitrarily combined with each other without colliding.

Embodiment 1

Figure 1:
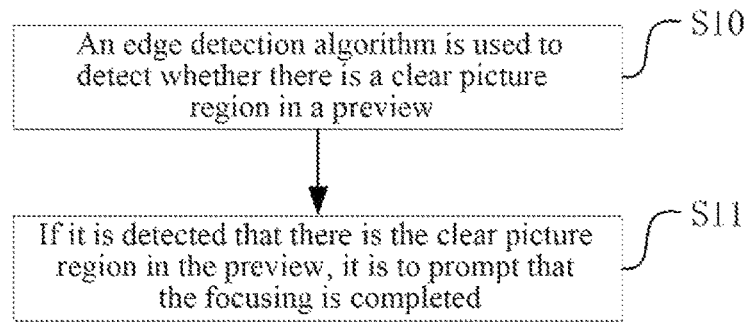
FIG. 1 is a flow chart of a method for prompting a focusing state of embodiment 1 of the present document.

As shown in FIG. 1, embodiment 1 provides a method for prompting a focusing state, including the following steps.

In step S10, whether there is a clear picture region in a preview is detected by using an edge detection algorithm.

In step S11, if it is detected that there is the clear picture region in the preview it is to prompt that focusing is completed.

During a focusing process, the edge detection is performed on a preview by using an edge detection algorithm, whether there is the clear picture region in the preview is judged according to a detection result, if yes, the focusing is determined to be completed, a user is prompted through a sound reminder, a lighting reminder, color outline, and other manners. Therefore, the user may shoot immediately after the focusing is completed, this not only improves a shooting speed but also ensures a shooting effect, thereby enhancing the user's experience. Meanwhile, the accuracy of performing the edge detection on the preview to determine the focusing state is higher.

Embodiment 2

Figure 2:
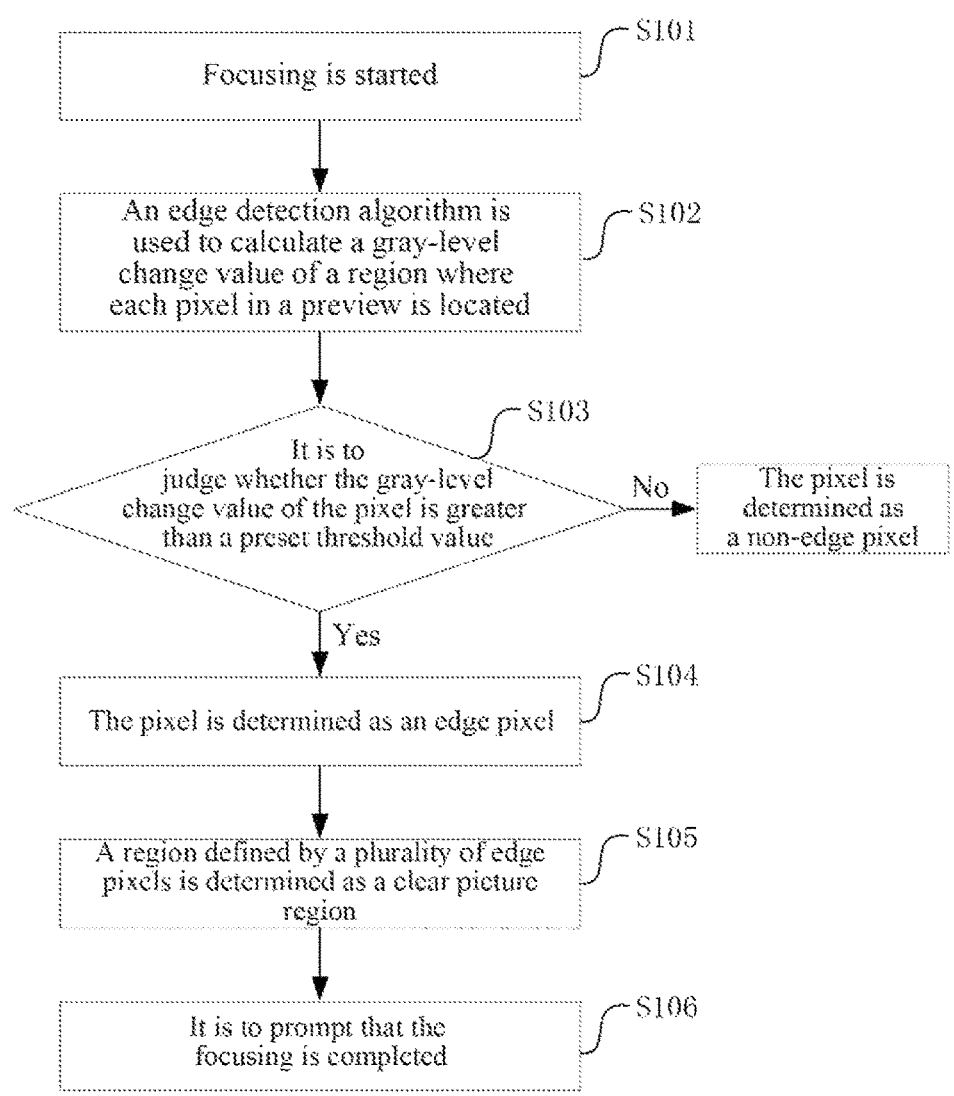
FIG. 2 is a flow chart of a method for prompting a focusing state of embodiment 2 of the present document.

Referring to FIG. 2, a method of prompting a focusing state of embodiment 2 of the present document is proposed based on embodiment 1, the method for prompting the focusing state includes the following steps.

In step S101: focusing is started.

In step S102: an edge detection algorithm is used to calculate a gray-level change value of a region of each pixel in a preview.

First, gray-level values of a plurality of pixels around or adjacent to pixel M in the preview are calculated, a region consisting of the pixel M and a plurality of the pixels surrounding the pixel M is a region herein the pixel M is located; a transverse gray-level change value and a longitudinal gray-level change value of the region where the pixel M is located is calculated by using the edge detection algorithm according to the gray-level value, the gray-level change value of the region where the pixel M is located is calculated according to the transverse gray-level change value and the longitudinal gray-level change value. Thereby all the pixels in the preview are traversed to calculate the gray-level change value of the region of each pixel in the preview.

Taking the Sobel operator as an example, it is supposed that a coordinate value of pixel A is (x, y), and function expression of a gray-level value of the pixel A is f (x, y). The pixel A and the eight pixels surrounding the pixel A are convolved through Sobel convolution factor to get the gray-level change value of the region consisting of the pixel A taken as a center and the eight pixels taken as surrounding.

Sobel convolution factor is shown below:

| −1 | 0 | +1 | +1 | +2 | +1 |
|---|---|---|---|---|---|
| −2 | 0 | +2 | 0 | 0 | 0 |
| −1 | 0 | +1 | −1 | −2 | −1 |

Sobel convolution factor consists of two groups of 3*3 matrices, which are a transverse convolution factor and a longitudinal convolution factor, respectively, a transverse brightness-difference approximate value and a longitudinal brightness-difference approximate value of the region of the pixel A, that is, the gray-level change values, can be obtained through the following formula:

$$G_x = \begin{bmatrix} -1 & 0 & +1 \\ -2 & 0 & +2 \\ -1 & 0 & +1 \end{bmatrix} * A$$

$$G_y = \begin{bmatrix} +1 & +2 & +1 \\ 0 & 0 & 0 \\ -1 & -2 & -1 \end{bmatrix} * A$$

Herein, a way for calculating the transverse gray-level change value Gx is as follows:

$$Gx = (-1)*f(x-1, y-1) + 0*f(x, y-1) + 1*f(x+1, y-1) +$$
$$(-2)*f(x-1, y) + 0*f(x, y) + 2*f(x+1, y) +$$
$$(-1)*f(x-1, y+1) + 0*f(x, y+1) + 1*f(x+1, y+1) =$$
$$[f(x+1, y-1) + 2*f(x+1, y) + f(x+1, y+1)] -$$
$$[f(x-1, y-1) + 2*f(x-1, y) + f(x-1, y+1)]$$

A way for calculating the longitudinal gray-level change value Gy is as follows:

$$Gy = 1*f(x-1, y-1) + 2*f(x, y-1) +$$
$$1*f(x+1, y-1) + 0*f(x-1, y) + 0*f(x, y) + 0*f(x+1, y) +$$
$$(-1)*f(x-1, y+1) + (-2)*f(x, y+1) + (-1)*f(x+1, y+1) =$$
$$[f(x-1, y-1) + 2f(x, y-1) + f(x+1, y-1)] -$$
$$[f(x-1, y+1) + 2*f(x, y+1) + f(x+1, y+1)]$$

Herein, f (a, b) represents the gray-level value of the pixel whose coordinate is (a, b).

The gray-level change value G of the region where the pixel A is located is calculated according to the transverse gray-level change value Gx and the longitudinal gray-level change value:

$$G = \sqrt{G_x^2 + G_y^2}$$

In step S103: whether the gray-level change value of the pixel is greater than a preset threshold value is judged.

If the gray-level change value G of the region where the pixel is located is larger than the preset threshold value, proceeding to step S103; if no, it is determined that the pixel is a non-edge pixel, if all the pixels in the preview are the non-edge pixels, it is determined that there is no a clear picture region in the preview, that is, the focusing has not yet been completed.

In step S104: the pixel is taken as an edge pixel.

The pixel is taken as the edge pixel if the gray-level change value G of the region where the pixel A is located is greater than the preset threshold value.

In step S105: the region defined by a plurality of the edge pixels is determined as the clear picture region;

Alternatively, when a plurality of the edge pixels are distributed in a closed-line shape, a region within the closed-line shape is determined as the clear picture region, and it is determined that the focusing is completed. The closed-line shape may be a circular-shape, a square-shape, an irregular-shape, or the like.

In other embodiment, although there are edge pixels in the preview, the number of the edge pixels is less than a preset value, or the edge pixels are not distributed in the closed-line shape, it is still determined that there is no the clear picture region in the preview, and the focusing is not completed.

In step S106: it is to prompt that the focusing is completed.

A voice prompt may be used, for example, the voice prompt "the focusing is complete" may be the sound of "beep" or "dooh". A light prompt may also be used, for example, an indicator light gives out a light in a certain color or flashes to give a prompt.

Alternatively, an edge of the clear picture region is marked by using a distinctive color to prompt that the focusing is completed, that is, the distinctive color is used to mark each edge pixel of the clear picture region. The distinctive color refers to a color that is distinct from a surrounding region or a nearby region, for example, the color of the edge of the clear picture region is darkened or faded so that the edge is distinct from the surrounding region, or the color of the edge of the clear picture region is replaced with the color that is distinct from the surrounding region.

Herein, the color may be marked by Graphics Processing Unit (GPU), here, a shader is used. The shader can be understood as instructions and data run in the GPU. The complete shader includes a vertex shader and a fragment shader. Herein the vertex shader is basically used to receive a coordinate of a point in a three-dimensional space, process the coordinate into a coordinate in a two-dimensional space and output the coordinate; the fragment shader is basically used to output a color value for each pixel to be processed on a screen. A process that a point coordinate in the two-dimensional space output by the vertex shader is converted into the pixel that is to be processed and transmitted to the fragment shader is called as primitive rasterization. The edge pixel is output based on a specified way (for example, deepening color, lighting color or using of a better color) or a specified color, the other pixels are output based on an original collected color value.

In addition to Sobel operator, the edge detection may also be performed by using Prewitt operator, Roberts Cross operator, and so on, it is detected whether there is the clear picture region in the preview, and then determined whether the focusing is completed.

The convolution factor of Prewitt operator is as follows:

| −1 | 0 | +1 | +1 | +1 | +1 |
|---|---|---|---|---|---|
| −1 | 0 | +1 | 0 | 0 | 0 |
| −1 | 0 | +1 | −1 | −1 | −1 |

The convolution factor of Roberts Cross operator is as follows:

| +1 | 0 | 0 | +1 |
|---|---|---|---|
| 0 | −1 | −1 | 0 |

The method of prompting the focusing state in the embodiment of the present document may be applied in the following scenarios: (1) the focusing state is determined through the edge detection algorithm after a touch focusing is performed; (2) the focusing state is determined through the edge detection algorithm during a manual focusing; (3) an ideal focal length is preset, and whether an object is in a focusing plane is determined rapidly through the edge detection algorithm.

For the method for prompting the focusing state in the embodiment of the present document, during a focusing process, the edge detection is performed on the preview using the edge detection algorithm, whether there is the clear picture region in the preview is determined according to a detection result, if yes, the focusing is determined to be completed. And a user is prompted through a sound reminder, a lighting reminder, color outline, and other manners. Therefore, the user may shoot immediately after the focusing is completed, this not only improves a shooting speed but also ensures a shooting effect. Meanwhile, the accuracy of performing the edge detection for the preview to determine the focusing state is higher.

Embodiment 3

Figure 3:
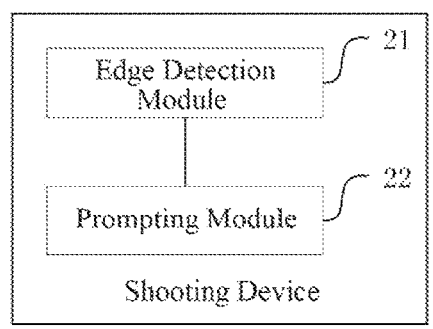
FIG. 3 is a structure block diagram of a shooting device of embodiment 3 of the present document.

Referring to FIG. 3, t a shooting device of the present document is provided, which includes an edge detection module 21 and a prompting module 22, herein the edge detection module 21 is configured to detect whether there is a clear picture region in a preview by using an edge detection algorithm, if yes send a signal to the prompting module 22.

The edge detection module 21 uses the edge detection algorithm to calculate a gray-level change value of the region where each pixels in the preview is located; the pixel is taken as an edge pixel if the gray-level change value of the pixel is greater than a preset threshold value; the region defined by a plurality of the edge pixels is determined as the clear picture region, and it is determined that the focusing is completed.

The edge detection module 21 may use Sobel operator, Prewitt operator or Roberts Cross operator to perform the edge detection, so as to obtain the gray-level change value of the region where each pixel is located. the edge detection module 21 first calculates gray-level values of a plurality of the pixels around pixel M in the preview, a region consisting of the pixel M and a plurality of the pixels around the pixel M is a region where the pixel M is located; the gray-level change value of the region of the pixel M is calculated using the edge detection algorithm according to the gray-level values, thereby all the pixels in the preview are traversed to calculate the gray-level change value of the region of each of the pixels in the preview.

The edge detection module 21 alternatively determines the region defined by a plurality of the edge pixels distributed in a closed-line shape as the clear picture region when determining the clear picture region, the closed-line shape may be a circular shape, a square shape, an irregular shape, or the like. If all the pixels in the preview are non-edge pixels or although there is the edge pixel in the preview, the number of the edge pixels is less than a preset value, or the edge pixels are not distributed in the closed-line shape, it is determined that there is no clear picture region in the preview, that is, it is determined that the focusing is not completed currently.

The prompting module 22 is configured to prompt the user that the focusing is completed according to the signal sent by the edge detection module 21.

The prompting module 22 may use a voice prompt, for example, the voice prompt "the focusing is complete" may be the sound of "beep" or "dooh". A light prompt may also be used, for example, an indicator light gives out a light in a certain color or flashes to give a prompt.

Alternatively, the prompting module 22 may use a distinctive color to mark an edge of the clear picture region to prompt that the focusing is completed, that is, the distinctive color is used to mark each edge pixel of the clear picture region. The distinctive color refers to a color that is distinct from a surrounding region or a nearby region, for example, a color of the edge of the clear picture region is darkened or faded to distinguish the edge from the surrounding region, or the color of the edge of the clear picture region is replaced with a color distinct from the surrounding region.

Thereby, during a focusing process, the shooting device of the embodiment of the invention uses the edge detection algorithm to perform the edge detection on the preview, judges whether there is the clear picture region in the preview according to a detection result, if yes, determines that the focusing is completed, prompts the user through a sound reminder, a lighting reminder, color outline, and other manners. Therefore, the user may shoot immediately after the focusing is completed, which not only improves a shooting speed but also ensures a shooting effect. Meanwhile, the accuracy of performing the edge detection for the preview to determine the focusing state is higher.

It should be noted that only the division of each of the above mentioned functional blocks is exemplified when the shooting device provided by the above embodiment prompts the focusing state. In practical applications, the distribution of the above functions may be completed by different function modules according to requirements. In addition, the shooting device provided by the above embodiment and the embodiment of the method for prompting the focusing state belong to the same concept, its implementation process is described in detail in an method embodiment, and will not be repeated here.

Embodiment 4

Figure 4:
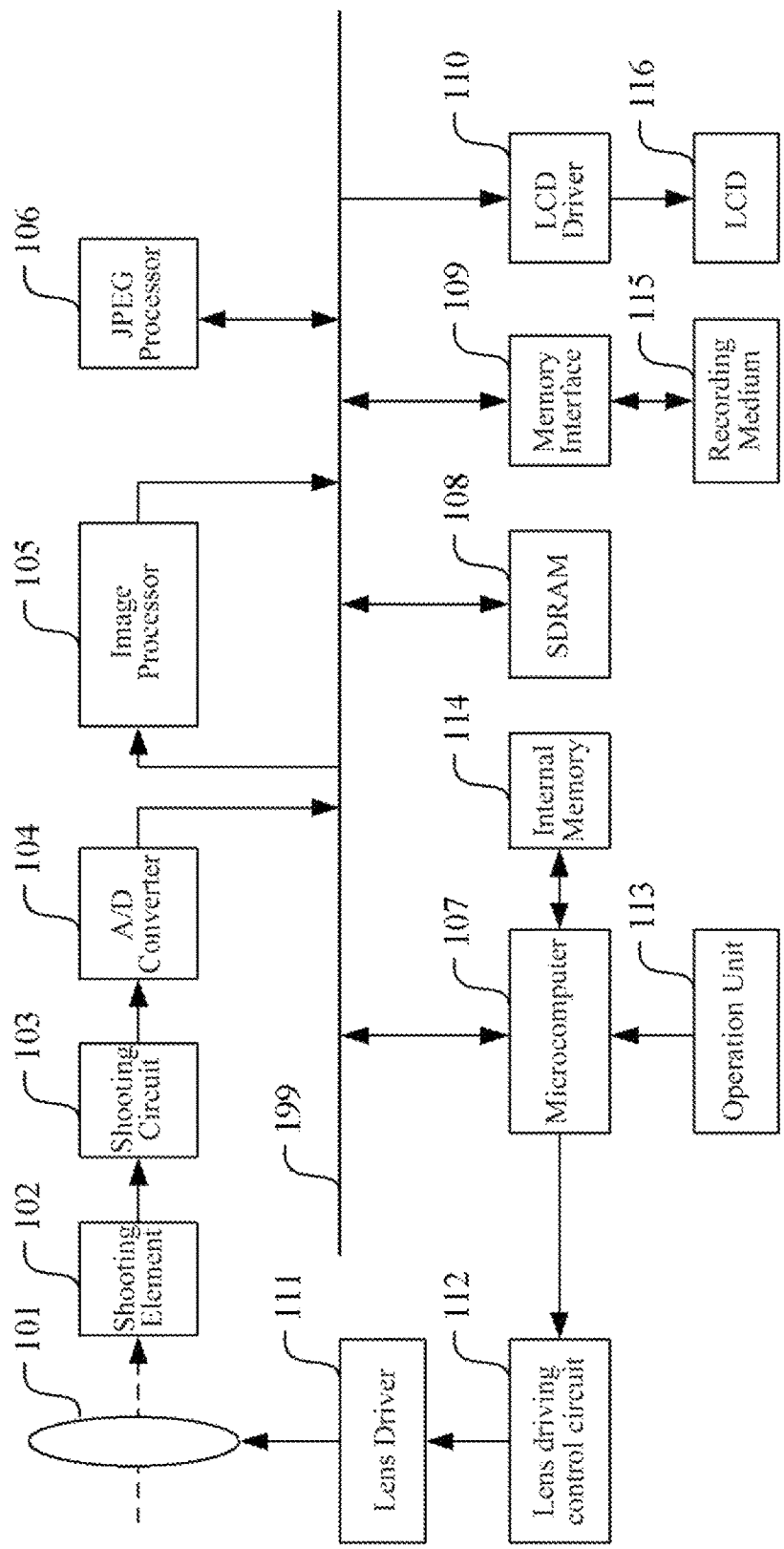
FIG. 4 is a diagram of a main electrical structure of a shooting device of embodiment 4 of the present document.

FIG. 4 is a block diagram of a main electrical structure of a shooting device of embodiment 4 of the present document. A lens 101 consists of a plurality of optical lenses for forming an image of a shot object and may be a single focus lens or a zoom lens. The lens 101 may be moved in an optical axis direction by a lens driver 111. A focus position of the lens 101 is controlled according to a control signal from a lens driving control circuit 112, a focus distance is also controlled in the case of the zoom lens. The lens driving control circuit 112 performs driving control on the lens driver 111 according to a control command from a microcomputer 107.

On an optical axis of the lens 101, a shooting element 102 is arranged in the vicinity of a position where the image of the shot object is formed by the lens 101. The shooting element 102 functions to shoot the image of the shot object and obtain an image signal. A photodiode constituting each pixel is arranged two-dimensionally on the shooting element 102 in a sharp of a matrix. The photodiode produces a photoelectric conversion current corresponding to light-absorption quantity, the photoelectric conversion current is accumulated with electrical charges by a capacitor connected to the photodiode. A front surface of each pixel is provided with a red-green-blue (RGB) color filter in Bayer arrangement.

The shooting element 102 is connected to a shooting circuit 103, the shooting circuit 103 performs charge accumulation control and image signal readout control in the shooting element 102. A readout image signal (an analog image signal) is subjected to waveform shaping by reducing a reset noise, thereby improving gain and the like to obtain an appropriate signal level.

The shooting circuit 103 is connected to an analog-to-digital (A/D) conversion portion 104, The A/D conversion portion 104 performs analog-to-digital conversion for the analog image signal, and outputs a digital image signal (hereinafter referred to as image data) to a bus 199.

The bus 199 is a transmission path that is set to transmit a plurality of kinds of data read out or generated in the shooting device. The bus 199 is connected to the above A/D conversion portion 104, an image processor 105, a Joint Photographic Experts Group (JPEG) processor 106, a microcomputer 107, an SDRAM (Synchronous DRAM) 108, a memory interface 109, and a Liquid Crystal Display (LCD) driver 110.

The image processor 105 performs image processing for the image data output based on the shooting element 102, The image processing includes one or more of the following processes: OB subtraction processing, white balance adjustment, color matrix operation, gamma conversion, color difference signal processing, noise removal processing, simultaneous processing, and edge processing.

A JPEG processor 106 compresses the image data read out from the SDRAM 108 according to a JPEG compression manner when the image data are recorded on a recording medium 115 through the memory interface 109 by the JPEG processor 106. In addition, the JPEG processor 106 performs decompression of JPEG image data for reproduction and display of the image. When decompression is performed, a file recorded in the recording medium 115 is read out, after the decompression processing is performed in the JPEG processor 106, the decompressed image data are temporarily stored in the SDRAM 108 and displayed on the LCD 116. In addition, in the embodiment, a JPEG manner is used as an image compression/decompression manner, but the compression/decompression manner is not limited to that, and other compression/decompression manners such as Moving Picture Experts Group (MPEG), Tagged Image File Format (TIFF), H.264 and so on can be used certainly.

The microcomputer 107 functions as a control portion as a whole of the shooting device, and controls a plurality of processing sequences of the shooting device uniformly. The microcomputer 107 is connected to an operation unit 113 and a flash memory 114.

The operating unit 113 includes but is not limited to a physical key or a virtual key. An operational state of the physical key or the virtual key is detected, and a detection result is output to the microcomputer 107. Furthermore, a touch panel is provided on a front surface of the LCD 116 as a display portion, and a touch position of a user is detected. The touch position is output to the microcomputer 107. The microcomputer 107 executes the processing sequence corresponding to the operation of the user based on the detection result of the key from the operation unit 113.

The flash memory 114 stores programs for executing a plurality of the processing sequences of the microcomputer 107. A flow of the programs executed by the microcomputer 107 is the steps S10-S11 and steps S101-S105 of the method in the above-described embodiment. The microcomputer 107 controls the entire shooting device according to the program. In addition, the flash memory 114 stores a plurality of adjustment values of the shooting device, and the microcomputer 107 reads the adjustment value and controls the shooting device in accordance with the adjustment value.

The SDRAM 108 is an electrically rewritable volatile memory which is provided to temporarily store the image data and the like. The SDRAM 108 temporarily stores the image data outputted from the A/D conversion portion 104 and the image data processed in the image processor 105, the JPEG processor 106 and the like.

The memory interface 109 is connected to the recording medium 115, the control of writing and reading out the image data and a file header added to the image data into and from the recording medium 115 is performed. The recording medium 115 is, for example, a recording medium such as a memory card that is detachably attached to a main body of the shooting device, and may be a hard disk or the like incorporated in the main body of the shooting device.

A LCD driver 110 is connected to the LCD 116, the image data processed by the image processor 105 is stored in the SDRAM, when display is required, the image data stored in the SDRAM is read and displayed on the LCD 116, or the image data compressed by the JPEG processor 106 are stored in the SDRAM, when the display is required, the JPEG processor 106 reads the compressed image data of the SDRAM, further decompresses the data and displays the decompressed image data through the LCD 116.

The LCD 116 is disposed on a rear surface of the main body of the shooting device to display an image. The LCD 116 is provided with the touch panel which detects the touch operation of the user. In addition, in the present embodiment, a liquid crystal display panel (LCD 116) is disposed as the display portion, and moreover, other display panels such as an Organic Light Emitting Plate (organic EL) and so on may also be used.

It will be understood by one skilled in the art that all or a portion of the steps in the above-described method may be completed by instructing an associated hardware by programs, the above programs may be stored in a computer-readable storage medium such as a read-only memory, a magnetic disk, or an optical disk. Alternatively, all or part of the steps of the embodiment described above may also be implemented by using one or more integrated circuits. Correspondingly, each module/unit in the above-described embodiment may be implemented in the form of a hardware or a software function module. The embodiments of the present document are not limited to any particular combination of hardware and software.

INDUSTRIAL APPLICABILITY

In a method for prompting a focusing state of an example of the present document, during a focusing process, edge detection is performed on a preview by using an edge detection algorithm, whether there is a clear picture region in the preview is determined according to a detection result, if yes, focusing is determined to be completed, a user is prompted through a sound reminder, a lighting reminder, color outline, and other manners. Therefore, a user may shoot immediately after the focusing is completed, which not only improves a shooting speed but also ensures a shooting effect. Meanwhile, the accuracy of performing the edge detection on the preview to determine the focusing state is higher.

What we claim is:

1. A method for prompting a focusing state, comprising:
using an edge detection algorithm to calculate a gray-level change value of a region where each pixel in a preview is located, wherein using the edge detection algorithm to calculate the gray-level change value of the region where each pixel in the preview is located comprises:
calculating gray-level values of a plurality of pixels around any one pixel in the preview, wherein a region consisting of the any one pixel and the plurality of pixels around the any one pixel is a region where the any one the pixel is located;
using the edge detection algorithm to calculate a gray-level change value of the region where the any one pixel is located according to the gray-level values; and
traversing all pixels in the preview to calculate the gray-level change value of the region where each pixel in the preview is located;
if a gray-level change value of a pixel is greater than a preset threshold value, taking the pixel as an edge pixel;
determining a region defined by a plurality of edge pixels as the clear picture region; and
prompting that focusing is completed.

2. The method for prompting the focusing state according to claim 1, wherein said prompting that focusing is completed comprises: marking an edge of the clear picture region by using a distinctive color to prompt that the focusing is completed.

3. The method for prompting the focusing state according to claim 2, wherein said marking an edge of the clear picture region by using a distinctive color comprises: darkening or fading a color of the edge of the clear picture region to be distinguished from a surrounding region, or replacing a color distinguished from a surrounding region for the edge of the clear picture region.

4. The method according to claim 3, wherein the color is marked by a vertex shader and a fragment shader in a Graphics Processing Unit (GPU), wherein the vertex shader is configured to receive a coordinate of a point in a three-dimensional space, process the coordinate into a coordinate in a two-dimensional space and output the coordinate; the fragment shader is configured to output a color value for the edge pixel in a specified form on a screen.

5. A non-transitory computer readable storage medium, storing program instructions, wherein when the program instructions are executed, the method according to claim 3 is realized.

6. A non-transitory computer readable storage medium, storing program instructions, wherein when the program instructions are executed, the method according to claim 2 is realized.

7. The method according to claim 1, wherein, the method further determining the region defined by the plurality of the edge pixels distributed in a closed-line shape as the clear picture region, when determining the clear picture region the closed-line shape is a circular shape, a square shape, or an irregular shape.

8. A non-transitory computer readable storage medium, storing program instructions, wherein when the program instructions are executed, the method according to claim 1 is realized.

9. A shooting device, comprising hardware configured to execute instructions stored in a non-transitory computer readable medium to execute steps in following modules:
an edge detection module and a prompting module, wherein:
the edge detection module is configured to use an edge detection algorithm to calculate a gray-level change value of a region where each pixel in a preview is located, if a gray-level change value of a pixel is greater than a preset threshold value, take the pixel as an edge pixel, determine a region defined by a plurality of edge pixels as the clear picture region, and send a signal to the prompting module;
the prompting module is configured to prompt a user that the focusing is completed according to the signal sent by the edge detection module;

wherein the edge detection module using the edge detection algorithm to calculate a gray-level change value of the region where each pixel in the preview is located comprises:
the edge detection module calculating gray-level values of a plurality of pixels around any one pixel in the preview, wherein, a region consisting of the any one of the pixels and a the plurality of the pixels surrounding around the any one pixel is a region of where the any one of the pixels is located;
the edge detection module using the edge detection algorithm to calculate the gray-level change value of the region where the any one pixel is located according to the gray-level values; and
thereby the edge detection module traversing all pixels in the preview to calculate the gray-level change value of the region where each pixel in the preview is located.

10. The shooting device according to claim 9, wherein the prompting module is configured to mark an edge of the clear picture region by using a distinctive color to prompt that the focusing is completed.

11. The shooting device according to claim 10, wherein the prompting module marking an edge of the clear picture region by using a distinctive color comprises:
the prompting module darkening or fading a color of the edge of the clear picture region to be distinguished from a surrounding region, or replacing a color distinguished from a surrounding region for the edge of the clear picture region.

12. The shooting device according to claim 9, wherein the edge detection module is configured to determine the region defined by the plurality of the edge pixels distributed in a closed-line shape as the clear picture region, when determining the clear picture region the closed-line shape is a circular shape, a square shape or an irregular shape.

* * * * *